(12) United States Patent
Bharali et al.

(10) Patent No.: US 9,503,480 B2
(45) Date of Patent: **\*Nov. 22, 2016**

(54) DEPLOYING POLICY CONFIGURATION ACROSS MULTIPLE SECURITY DEVICES THROUGH HIERARCHICAL CONFIGURATION TEMPLATES

(71) Applicant: Palo Alto Networks, Inc., Santa Clara, CA (US)

(72) Inventors: Anupam Bharali, San Jose, CA (US); Kunal Kundu, Cupertino, CA (US); Zhi Ning Wang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,337

(22) Filed: Mar. 31, 2015

(65) Prior Publication Data

US 2015/0281285 A1    Oct. 1, 2015

Related U.S. Application Data

(63) Continuation of application No. 13/460,576, filed on Apr. 30, 2012, now Pat. No. 9,027,077.

(51) Int. Cl.
| | |
|---|---|
| *H04L 29/00* | (2006.01) |
| *H04L 29/06* | (2006.01) |
| *G06F 17/30* | (2006.01) |
| *G06F 21/00* | (2013.01) |
| *G06F 21/60* | (2013.01) |

(52) U.S. Cl.
CPC ............... *H04L 63/20* (2013.01); *G06F 17/30* (2013.01); *G06F 21/00* (2013.01); *G06F 21/604* (2013.01); *H04L 63/02* (2013.01); *H04L 63/08* (2013.01)

(58) Field of Classification Search
CPC ........................................................ G06F 17/30
USPC ................................................................ 726/1
See application file for complete search history.

(56) References Cited

U.S. PATENT DOCUMENTS

| | | | | |
|---|---|---|---|---|
| 5,797,128 A | * | 8/1998 | Birnbaum | .................. G06F 9/50 |
| 6,678,827 B1 | * | 1/2004 | Rothermel | .............. H04L 29/06 |
| | | | | 709/223 |

\* cited by examiner

*Primary Examiner* — Michael D Anderson
(74) *Attorney, Agent, or Firm* — Van Pelt, Yi & James LLP

(57) ABSTRACT

Deploying policy configuration across multiple security devices through hierarchical configuration templates is disclosed. In some embodiments, deploying policy configuration across multiple security devices through hierarchical configuration templates for configuring a plurality of security devices includes receiving at a first security device a hierarchy of templates from a central management server, in which the hierarchy of templates includes configuration information for a group of security devices, and in which the first security device is included in the group of security devices; and reconciling on the first security device's configuration information included in the hierarchy of templates and device specific configuration based on local configuration information, in which the first security device performs an object level reconciliation to maintain device configuration consistency.

20 Claims, 10 Drawing Sheets

DEPLOYING POLICY CONFIGURATION ACROSS MULTIPLE SECURITY DEVICES THROUGH HIERARCHICAL CONFIGURATION TEMPLATES

CROSS REFERENCE TO OTHER APPLICATIONS

This application is a continuation of co-pending U.S. patent application Ser. No. 13/460,576, entitled DEPLOYING POLICY CONFIGURATION ACROSS MULTIPLE SECURITY DEVICES THROUGH HIERARCHICAL CONFIGURATION TEMPLATES filed Apr. 30, 2012 which is incorporated herein by reference for all purposes.

BACKGROUND OF THE INVENTION

Network administrators or security administrators typically manage network devices in computer networks by configuring and reconfiguring the network devices using a central management server (CMS). For example, network administrators or security administrators can use a CMS to configure firewalls and routers within computer networks to have appropriate security and routing policies.

BRIEF DESCRIPTION OF THE DRAWINGS

Various embodiments of the invention are disclosed in the following detailed description and the accompanying drawings.

DETAILED DESCRIPTION

Figure 1:
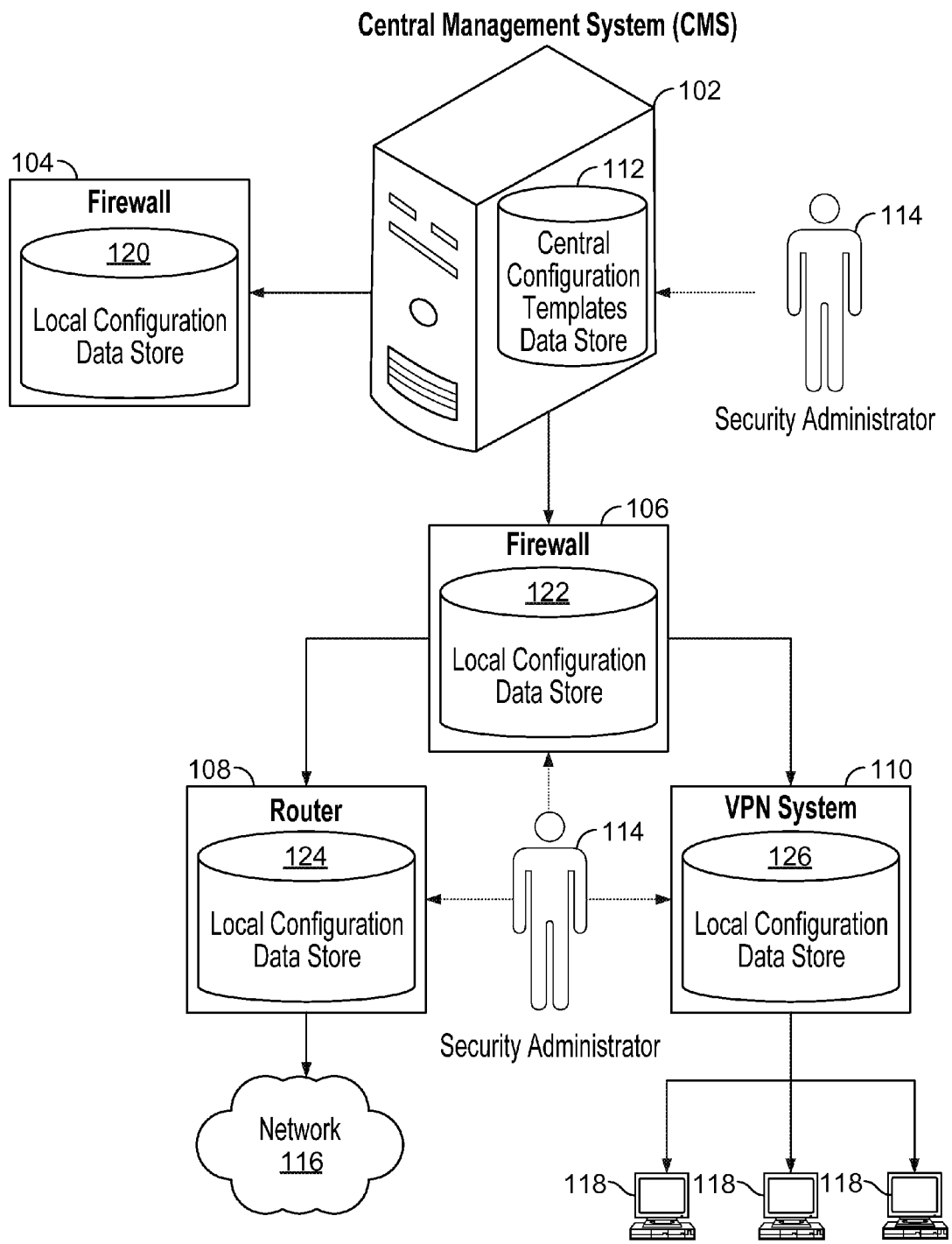
FIG. 1 is a diagram of a network topology including various security devices and a central management system for deploying policy configuration across multiple security devices through hierarchical configuration templates in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Security administrators (e.g., security admins) typically manage security devices in computer networks by configuring and reconfiguring the network devices using a central management model. For example, security admins can use a central management server (CMS) to configure firewalls and gateways within computer networks to have appropriate security policies.

Specifically, security admins typically manage security devices (e.g., security devices/software that provide firewall, URL filtering, Intrusion Detection/Prevention, Anti-Virus, and/or Anti-Spyware functionality, or integrated security gateway, security appliance, and/or other security devices, including networking devices, such as bridges and routers) using a central management model. Using a central management model, a security admin creates configuration information at a central database (e.g., in a central management system) and then pushes the configuration information from the central database to network devices. For example, a security admin can enter configuration information at a central management system (CMS) that sends the configuration information to network devices.

For some network devices, security admins manage such network devices using a device management model (e.g., sometimes referred to as remote management). Using a device management model, a security admin can configure a network device by directly contacting the network device (e.g., for remote configuration using a command line interface (CLI) or graphical user interface (GUI)). For example, for some network devices, a network administrator can log in to the network device using a web browser on a computer on the network.

As an example, a security policy is typically configured on a security appliance using a command line interface (CLI) console or a web interface (e.g., using a GUI). When multiple security appliances are deployed for redundancy and for covering multiple locations, the individual device configuration using the device management model quickly becomes a tedious and time consuming operation. Generally, security admins prefer to enforce a common uniform security policy across all the security devices that conforms to a corporate/entity policy. A common solution to this issue is to use a central management system (CMS) (e.g., CMS can be implemented as a software solution executed on a general purpose server or as a dedicated appliance) where the common policies are configured and distributed to multiple devices.

However, such approaches typically only allow for network admins to either configure devices using a central management model or using a device management model (e.g., device management model only). For example, if only a central management model is supported (e.g., central management model only), then device configuration can be delayed or disrupted if the CMS is down or unavailable (e.g., CMS server is down or network connectivity with the CMS server is down). Also, if only a device management model is supported, then central configuration of multiple devices is more time consuming for network admins and inconsistencies in configurations can result from having to configure such individual device remote configurations for each security device on the network.

What are needed are techniques for supporting security device configuration using a central management model that also supports a device management model with local device configuration override. Accordingly, deploying policy configuration across multiple security devices through hierarchical configuration templates is disclosed. In some embodiments, various methods, systems, and apparatus, including computer programs encoded on a non-transitory computer readable storage medium, for configuring network devices by deploying policy configuration across multiple security devices through hierarchical configuration templates are provided.

As an example use scenario, using the various techniques described herein can help a hotel chain with business centers containing print server/printer, file server, and guest Wi-Fi networks with the same network architectures. Configuration templates can be used to efficiently distribute common configuration settings and individual firewall configuration settings can be modified locally for differences as needed. As another example use scenario, a mailing service with mail service centers across the United States, in which the mail service centers have the same network architectures and device settings, configuration templates can be used to efficiently distribute common configuration settings to these many locations across the United States.

Also, device and network configuration templates as described herein can facilitate the following: spread device setup (e.g., management interface configuration, disk quotas, etc.) across an entire deployment; multiple templates for network configuration that applies to two different device groups for large versus small sites, and other templates that apply to selected devices that have special independent configurations (e.g., virtual system (VSYS) enabled versus single VSYS).

In some embodiments, such techniques provide for reconciliation of central and local device configurations for each of the managed security devices.

In some embodiments, such techniques provide a flexible mechanism where shared security policies can be configured on the CMS using a hierarchy of templates and allows for device specific configuration and template override on each security device as well as on the central configuration.

In some embodiments, such techniques facilitate the seamless use of a hierarchy of templates on a CMS to define and fine-tune configuration for a group of security devices to enforce a uniform security policy.

In some embodiments, such techniques facilitate the seamless use of security device specific configurations that can reference available templates targeted for any deployed device from a CMS.

In some embodiments, such techniques facilitate the seamless use of security device specific configurations that can reference centrally defined templates and override template values based on permissibility (e.g., the override values can be configured on the security device, and the reconciliation process can be executed on the local security device).

In some embodiments, such techniques do not require real time synchronization of security device configuration back to central management (e.g., such that these techniques that support local device configuration can be provided even if the CMS is temporarily unavailable for synchronization as the reconciliation is performed locally on the security device). Thus, techniques for supporting security device configuration using a central management model that also supports a device management model with local device configuration override are provided without requiring extensive synchronization of policies between a central configuration and a device configuration.

In some embodiments, deploying policy configuration across multiple security devices through hierarchical configuration templates for configuring a plurality of security devices includes receiving a configuration input for a hierarchy of templates, and implementing central configuration management for the plurality of security devices using the hierarchy of templates that facilitates device specific configuration based on local configuration information and template override of template-based configuration information, in which each security device locally reconciles the hierarchy of templates with local configuration information. In some embodiments, a hierarchical relationship of a plurality of templates determines an override priority for objects and fields with each of the templates. In some embodiments, a template comprises a predefined table of configuration settings for configuring a group of security devices, and in which local configuration information comprises device specific configuration for configuring a specified security device. In some embodiments, deploying policy configuration across multiple security devices through hierarchical configuration templates for configuring a plurality of security devices further includes pushing the hierarchy of templates to a group of managed security devices from a central management server (CMS), in which the plurality of security devices are grouped based on location, type of device, and/or processing level of device.

In some embodiments, deploying policy configuration across multiple security devices through hierarchical configuration templates for configuring a plurality of security devices includes receiving at a first security device a hierarchy of templates from a central management server, in which the hierarchy of templates includes: configuration information for a group of security devices, and in which the first security device is included in the group of security devices; and reconciling on the first security device's configuration information included in the hierarchy of templates and device specific configuration based on local configuration information, in which the first security device performs an object level reconciliation to maintain device configuration consistency. In some embodiments, deploying policy configuration across multiple security devices through hierarchical configuration templates for configuring a plurality of security devices further includes performing field level reconciliation on the first security device. In some embodiments, deploying policy configuration across multiple security devices through hierarchical configuration templates for configuring a plurality of security devices further includes storing configuration setting change information based on the reconciliation of the first security device's configuration information included in the hierarchy of templates and device specific configuration based on local configuration information. In some embodiments, deploying policy configuration across multiple security devices through hierarchical configuration templates for configuring a plurality of security devices further includes storing configuration setting change information that associates a template override with a higher priority template or a local configuration change with an authorized user input of a device specific configuration change. In some embodiments, deploying policy configuration across multiple security devices through hierarchical configuration templates for configuring a plurality of security devices further includes displaying configuration setting change information that associates a template override with a higher priority template or a local configuration change with an authorized user input of a device specific configuration change.

In some embodiments, deploying policy configuration across multiple security devices through hierarchical configuration templates for configuring a plurality of security devices includes receiving a configuration input for a hierarchy of templates; and implementing central management for the plurality of security devices using the hierarchy of templates that facilitates device specific configuration based on local configuration information and template override of template based configuration information, in which each security device stores a locally viewable source of configuration setting information. In some embodiments, the locally viewable source of configuration setting information includes a configuration setting change history. In some embodiments, the locally viewable source of configuration setting information includes a configuration setting change history that facilitates a revertable security device configuration performed locally. In some embodiments, deploying policy configuration across multiple security devices through hierarchical configuration templates for configuring a plurality of security devices further includes performing a configuration rollback on one or more of the plurality of security devices to revert a local configuration change or to revert to a different level of template hierarchy configuration for an object or field. In some embodiments, deploying policy configuration across multiple security devices through hierarchical configuration templates for configuring a plurality of security devices further includes presenting a preview of a configuration change on each of the plurality of security devices prior to pushing the hierarchy of templates to each of the plurality of security devices.

In some embodiments, deploying policy configuration across multiple security devices through hierarchical configuration templates for configuring a plurality of security devices further includes performing an object level and field level reconciliation, in which an object includes one or more related fields (e.g., a system object can include one or more related fields, such as host name, IP address, and mask). In some embodiments, deploying policy configuration across multiple security devices through hierarchical configuration templates for configuring a plurality of security devices further includes performing a field level merge based on a priority relationship of the hierarchy of templates and local configuration information for the first security device.

In some embodiments, deploying policy configuration across multiple security devices through hierarchical configuration templates for configuring a plurality of security devices further includes converting configuration information provided by the hierarchy of templates locally on the first security device based on attributes associated with the first security device, in which converting supports upgrade or downgrade of configuration information based on translation information received from a central management server.

FIG. 1 is a diagram of a network topology including various security devices and a central management system for deploying policy configuration across multiple security devices through hierarchical configuration templates in accordance with some embodiments.

In some embodiments, when a number of security devices are deployed for operation, the security devices are classified into a logical hierarchy or grouping. For example, in a simple grouping, only a single level deep grouping is provided (e.g., by type of device), and in other cases, the hierarchy can be multi-level deep (e.g., by location, by type of device, by level of processing of the device). The hierarchy can be organized by geographic locations of the devices, aligned with administrative hierarchy, operational hierarchy, deployment hierarchy (e.g., remote office versus central office), protection entities (e.g., data center versus edge device), and/or various other attributes and/or criteria.

In some embodiments, the security devices can be independently configured in its entirety. Any supported policy for the security device can be locally configured and enforced without the need for any external entity. The configuration can be achieved by command line interface (CLI), web interface to the device directly, an application programming interface (API), and/or using various other mechanisms. For example, each device can be configured independent of each other to achieve a desired policy goal.

In some embodiments, a central management platform (e.g., CMS 102) is used to define a number of templates (e.g., configuration entities). The security administrator can define the templates and organize them in a hierarchy. The security administrator can define portions of the overall configuration spread across the templates. The security administrator has the ability to optionally override any child template value (e.g., an object field, which refers to a field within an object, or an entire object) already defined in the parent hierarchy (e.g., immediate parent or otherwise). The security administrator can also override a template value for a specific device or a device group (e.g., static or dynamically defined matching certain criteria).

The template configuration can be pushed to a security device keeping the hierarchical structure if the security device is allowed to roll back to a template value in any level in the hierarchy. This approach also allows the device policy configuration to show the full template hierarchy for an object. This approach also allows for visualizing clearly how an effective value for an object is derived in the presence of multi-level, hierarchical templates. For example, a GUI can distinctly show if a value is simply locally configured, configured through the template, or overridden by the device. The user interface can provide the provision to show how the configured value of an object is changed as multiple layers of templates are applied, each overriding the same object.

Referring to FIG. 1, the central management system (CMS) 102 is a system that manages security devices, such as firewalls 104 and 106, router 108, and Virtual Private Network (VPN) system 110. The central management system 102 is typically one or more computer systems connected to a network (e.g., network 116). A security device generally refers to a device that performs one or more tasks related to managing, routing, monitoring, and/or filtering network traffic. Example security devices include firewalls, Intrusion Detection Systems (IDSs), Intrusion Prevention Systems (IPSs), and Unified Threat Management (UTM) devices (e.g., integrated security appliances and security gateways), routers, and VPN systems. Those of ordinary skill in the art will also appreciate that various other security devices exist and can benefit from the various configuration techniques described herein with respect to various embodiments.

Managing security devices generally includes monitoring or controlling the network devices, or both. Monitoring the security devices can include polling the security devices (e.g., sending messages to the security devices and receiving response messages) and logging messages from the security devices (e.g., status messages). Controlling the security devices can include sending specific instructions to the security devices (e.g., to perform certain tasks) or sending configuration information to the security devices.

Configuration information generally refers to information that specifies how a security device should operate, such as by setting parameters or values related to configuration of the security device. For example, configuration information can be specified by configuration objects. In general, a configuration object (e.g., one or more parameters and associated values) specifies a particular piece of information that a network device uses to process packets. Alternatively, a configuration object specifies information that a network device uses to control user authentication and authorization, process authentication and authorization, or the like.

A configuration object has a respective value. For example, a configuration object that specifies how frequently a network device will send status to the central management system 102 can have a respective value of one minute, specifying that the network device will send status information once every minute. In some embodiments, a configuration object is represented as one or more names, value pairs such that names serve to identify their respective values. Some configuration objects have more than one respective value, and other configuration objects have respective data structures including a plurality of values. In some embodiments, a configuration object is represented as an XML object.

In some embodiments, a configuration object includes one or more fields. In some embodiments, a configuration object can be overridden by a higher priority template at an object level (e.g., in some cases, an object cannot be modified by a hierarchical template at a field level of granularity, only at an object level). In some embodiments, a configuration object can be overridden by a local configuration input at an object level (e.g., in some cases, an object cannot be modified by a hierarchical template at a field level of granularity, only at an object level). In some embodiments, a configuration object can be overridden at a field level of configuration change by a higher priority template. In some embodiments, a configuration object can be overridden at a field level of configuration change by a local configuration input.

Examples of configuration objects for firewalls include: various security policy parameters; routing information; and software updates including updated methods of identifying viruses, spam, and other security threats, as well as other security related configuration information. Examples of configuration objects for routers include: updates to routing tables, static route information, and other router related configuration information. Examples of configuration objects for VPN systems include: various authentication parameters, user account information (e.g., for users at client devices 118, such as computers, laptops, tablets, or other computing devices, communicating with a VPN system 110), and other VPN related configuration information. As would be apparent to those of ordinary skill in the art, various other configuration objects can also be provided for security device configuration.

A security administrator 114 manages the central management system 102. For example, the security administrator can interact with the central management system 102 directly (e.g., through input/output devices connected to the central management system 102) or remotely (e.g., by using a computer on a network connected to the central management system 102). In some embodiments, the security administrator 114 interacts with the central management system 102 using a web browser or a Secure Shell (SSH) client. In some embodiments, the security administrator can similarly interact directly or remotely with each of the security devices to view and/or modify the security device configuration information of that security device. For example, the security administrator 114 can interact with the central management system 102 (or a network device) using a web browser, and the web browser periodically updates a display device with current configuration information on the central management system 102 or security devices.

The central management system 102 includes a central configuration data store 112 for storing configuration templates. The configuration templates (e.g., also referred to as templates) are hierarchical. The hierarchy provides an inherent priority for efficiently reconciling the configuration information (e.g., which can be overlapping or conflict with respect to one or more configuration objects or fields within one or more configuration objects). In some embodiments, the hierarchical templates associated with a particular security device are reconciled by that security device locally (e.g., which may also need to reconcile the template configuration information with local configuration input). In some embodiments, the configuration templates are stored in a database. A database generally refers to a collection of information that can be stored in various formats using various computing or storage devices connected by one or more networks or other communication means. Various database management systems, database architectures, database storage structures, and database models are possible (e.g., the central management system 102 can use a Relational Database Management System (RBDMS)). The central configuration data store 112 includes configuration templates. In some embodiments, configuration templates are shared configuration objects for efficiently and consistently configuring a set of security devices, such as a group of security devices. For example, security devices can be grouped based on various attributes or criteria, such as location, type of device, processing level/capability of the security device, and/or other attributes and/or criteria. The central configuration data store 112 can store the configuration templates in various data structures (e.g., tables, files, or other data structures).

In some embodiments, configuration templates or templates include configuration objects that are associated with a group of security devices (e.g., generally for associating the configuration information in the template with one or more security devices). For example, a template for a firewall (e.g., a security policy) can be associated with a first firewall 104 and a second firewall 106. In some embodiments, the central management system 102 associates templates with security devices by grouping security devices, such as by defining a firewall group that includes the firewall 104 and the firewall 106. For example, the groups (e.g., lists or other data structures for defining groups of associated security devices) can be stored in the central configuration data store 112.

Because templates include shared configuration objects that are generally associated with two or more security devices or groups of security devices, it is efficient to maintain such templates stored at the central management system 102. For example, when the security administrator 114 needs to update a template, the security administrator 114 can update the template at the central management system 102 and avoid having to individually update each security device associated with that template.

As also shown, each of the security devices includes local configuration data stores (e.g., local configuration data stores 120, 122, 124, and 126). In some embodiments, the local configuration data store includes device specific configuration information and one or more templates (e.g., a hierarchy of templates) associated with the security device (e.g., or group(s) to which that security device is a member). For example, the local configuration data store can store the device specific configuration information (e.g., local configuration input that can include configuration objects and/or field level configuration changes) in various data structures. In some embodiments, locally input device specific configuration information and one or more templates-based (e.g., a hierarchy of templates) configuration information is reconciled locally on each security device. In some embodiments, the local configuration data store includes a database for storing reconciled configuration information. In some embodiments, the reconciled configuration information is maintained and stored locally (e.g., in the local configuration data store which can be maintained on the local security device, or in some cases, distributed across other security devices on the network). In some embodiments, the reconciled configuration information is replicated for storage on the central management system 102 (e.g., for archival, recovery, and/or central remote viewing and display from the CMS).

Security administrators 114 can directly configure a security device with local configuration information, which generally refers to configuration input that is specific to that security device (e.g., device specific configuration objects and/or input at a field level of granularity within a configuration object). Device specific configuration objects generally refer to configuration objects that are associated with a specific network device. For example, a device-specific configuration object for the first firewall 104 can specify an address where the first firewall 104 is to block all packets from that address, and a device specific configuration object for the second firewall 106 can specify the same address but that the second firewall 106 is to allow all packets from that address to pass. In another example, a device specific configuration object for the first firewall 104 specifies an IP address for a central management system, Domain Name System (DNS) server, or other management system.

In some embodiments, the central management system 102 sends hierarchies of templates to the security devices that are associated with each respective hierarchy of templates (e.g., in a template configuration push of configuration information to groups of security devices). Each of the security devices processes their receive hierarchy of templates by reconciling the hierarchy of templates and local configuration information (if any) to, for example, configure how the security device performs its various functions, such as for processing packets. Examples of processing packets include: determining whether to drop or allow a packet, determining an application associated with a packet, inspecting a packet or several packets for a virus, routing a packet to a destination, authenticating one or more users, and/or various other packet processing and/or filtering functions. In some cases, the security devices can use the device specific configuration objects to process packets, if for example, local configuration information included device specific configuration objects (e.g., or fields) that overrode one or more shared, central configuration objects in a configuration template.

For example, the security administrator 114 can create new or modify existing templates (e.g., updating respective values of shared configuration objects) at the central management system 102. When the security administrator 114 updates a template, the central management system 102 updates the central configuration data store 112 and sends the new value to security devices associated with the updated template (e.g., by sending just the updated field or shared object or by sending the updated template, or by sending the respective hierarchy of templates that have been modified, updated, and/or created, and are associated with such security devices, which can be sent in a scheduled push distribution, a periodic push distribution, in response to a polling for updates request(s) from the security device(s), and/or in response to an event such as the updated template providing a trigger action for the push distribution).

As another example, the security administrator 114 can also update local configuration information on a particular security device by, for instance, updating device specific configuration objects in local configuration databases by communicating directly with security devices (e.g., not using the central management system). The security device can then perform a reconciliation process to update its local configuration by reconciling the hierarchy of templates and the local configuration information using various reconciliation techniques such as described herein. In some embodiments, the reconciled configuration information is stored locally. In some embodiments, the reconciled configuration information (e.g., and/or the local configuration information) can also be sent to the central management system 102 for archival.

In some embodiments, the security administrator 114 updates a respective value of a device specific configuration object for a particular security device using the central management system (e.g., as a central console for remote configuration of the security device), and the central management system 102 sends the new value to the network device that uses the updated device specific configuration object by performing a reconciliation process of the hierarchy of templates and local configuration information including the updated device specific configuration object using various reconciliation techniques such as described herein, and the security device updates its local configuration data store accordingly.

In some embodiments, the security administrator 114 updates several configuration objects on several security devices with a single action by, for example, updating a template or a set of templates associated with a group of security devices. For example, the network administrator 114 can send a hierarchy of templates (e.g., using the central management system 102) to the group of security devices. In that case, reconciliation of the templates on each of the security devices can result in some of the configuration objects being irrelevant to some of the security devices, intentionally or unintentionally. Security devices receiving updated values for irrelevant configuration objects can take various actions, for example, discarding the updated values, sending error messages to the central management system 102, storing the irrelevant values in their local configuration databases and not using them, logging the values as not implemented based on the reconciliation determination, logging a source of the irrelevant configuration values, and/or by performing various other responsive actions.

In some embodiments, a central policy associated with a security device can be merged with a local device configuration stored on the security device (e.g., by performing a reconciliation process on the security device to effectively merge such configuration template sources into a single resultant effective template configuration on the security device). In some embodiments, the central policy overwrites certain local device configuration stored on the security device (e.g., by performing a reconciliation process on the security device), which, for example, can be applied to the entire configuration or to specific sections of the configuration. In some embodiments, the local configuration stored on the security device overwrites certain central policy (e.g., by performing a reconciliation process on the security device), which, for example, can be applied to the entire configuration or to specific sections of the configuration.

For example, the security administrator 114 can update the respective value of a configuration object in a local configuration data store (e.g., local configuration data store 120) of a security device that corresponds to a shared configuration object in a template stored in a central configuration database (e.g., central configuration data store 112) and associated with that security device. In those cases, if the local configuration is determined by the reconciliation process to permit the local configuration value to override the central, shared configuration value, then the respective value of the shared configuration object in the central configuration data store 112 will not match the respective value of the corresponding local configuration object in the local configuration data store 120 for this particular security device. In some embodiments, a change log maintains a history of configuration changes (e.g., central/shared and local configuration changes, authorized users associated with configuration changes such as to indicate which security admin is associated with which configuration change(s), and date/time stamp information associated with configuration changes). In some embodiments, the change log supports various roll-back mechanisms for reverting one or more configuration changes, such as overridden central, shared configuration values, such as in the above discussed example (e.g., rolled back to any layer of the template values). In some embodiments, the change log also allows for a display mechanism for presenting a visual indicator of any such overridden configuration changes to show the local configuration override changes for a particular security device (e.g., providing a GUI representation that can show any layer of template values that the field or object can roll back to and/or marking the template source and/or local configuration source on a GUI for a configuration entity, such as for trouble shooting or accurately indicating current or past configuration settings for the security device based on reconciled hierarchical templates and local configuration input).

In some embodiments, the section of the configuration that can be configured within a template can be predefined (e.g., predefined configurable sections of the template). In some embodiments, the scope of the allowable configuration can be extended to user defined.

In some embodiments, the device can override at a field level of granularity and/or the device can override at an object level with all the fields within the object. For example, the specification of whether a configuration value override is allowed and whether at an object level or at a field level can be provided in predefined manner for different sections of the configuration. In some embodiments, the specification can be extended to be defined and/or customized by a user.

In some embodiments, the central management system 102 provides functionality to preview an effective configuration with the merger of template values and local device specific configuration before applying to a security device or a group of security devices.

In some embodiments, the various techniques described herein allow for a security device to disassociate its ties to central management and still be manageable as a stand-alone entity with a valid security device configuration. In particular, the central policy can be imported into a security device local configuration to maintain the same policy enforcement.

In some embodiments, a configuration option is provided on the central management server (CMS) 102 or a security device to specify if hierarchical template awareness is available on the security device.

In some embodiments, if the above level of rollback or visualization on the security device end is not required or desired, the implementation can be simplified by generating the effective template configuration on central management or pushing only the single final template configuration to a device. In this approach, the security administrator can still be optionally permitted to override any or all template values locally on the device end for final policy enforcement. The final effective policy for a device is formed overlaying local device configuration over the (effective) central management template configuration.

In some embodiments, the security device and the central management system 102 perform various other actions to coordinate configuration information. Various other actions are described in reference to FIGS. 2-8.

Figure 2:
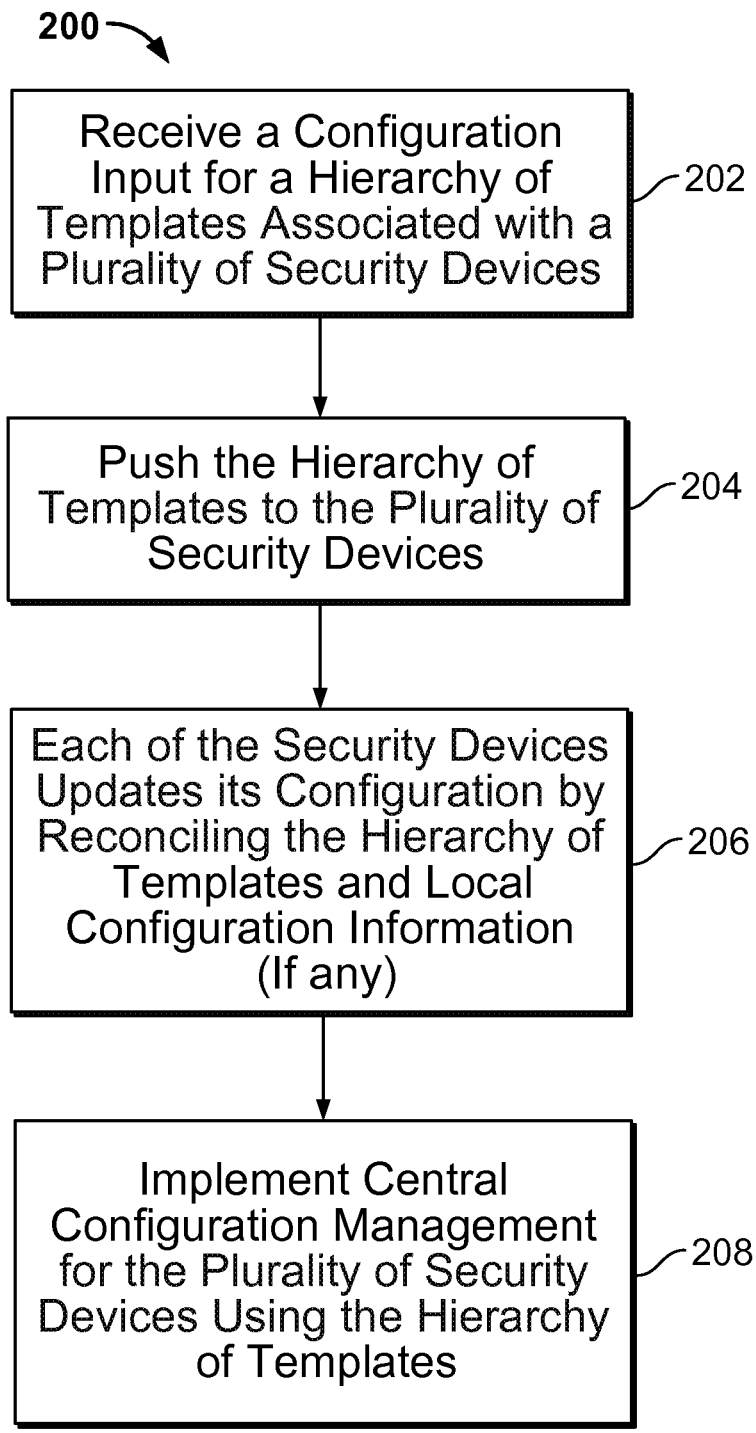
FIG. 2 is a flow diagram for deploying policy configuration across multiple security devices through hierarchical configuration templates in accordance with some embodiments.

FIG. 2 is a flow diagram for deploying policy configuration across multiple security devices through hierarchical configuration templates in accordance with some embodiments.

In some embodiments, FIG. 2 illustrates an example technique 200 performed by a central management system (e.g., central management system 102, although various central management systems are possible) for configuring security devices (e.g., firewall 106) by deploying policy configuration across multiple security devices through hierarchical configuration templates for configuring a plurality of security devices. The central management system stores configuration templates in a central configuration data store for the central management system. Configuration templates include configuration objects that can be used by a network device to process packets for enforcing a policy (e.g., a security policy).

As shown, at 202, a configuration input for a hierarchy of templates associated with a plurality of security devices is received. At 204, the hierarchy of templates are pushed to each of the plurality of security devices. At 206, each of the security devices updates its configuration by reconciling the hierarchy of templates and local configuration information (if any). At 208, implementing central configuration management for the plurality of security devices using the hierarchy of templates is performed such that device specific configuration based on local configuration information and template override of template-based configuration information. In some embodiments, a hierarchical relationship of a plurality of templates determines an override priority for objects and fields with each of the templates. In some embodiments, a template comprises a predefined table of configuration settings for configuring a group of security devices, and in which local configuration information comprises device specific configuration for configuring a specified security device. In some embodiments, deploying policy configuration across multiple security devices through hierarchical configuration templates for configuring a plurality of security devices further includes pushing the hierarchy of templates to a group of managed security devices from a central management server (CMS), in which the plurality of security devices are grouped based on location, type of device, and/or processing level of device.

Figure 3:
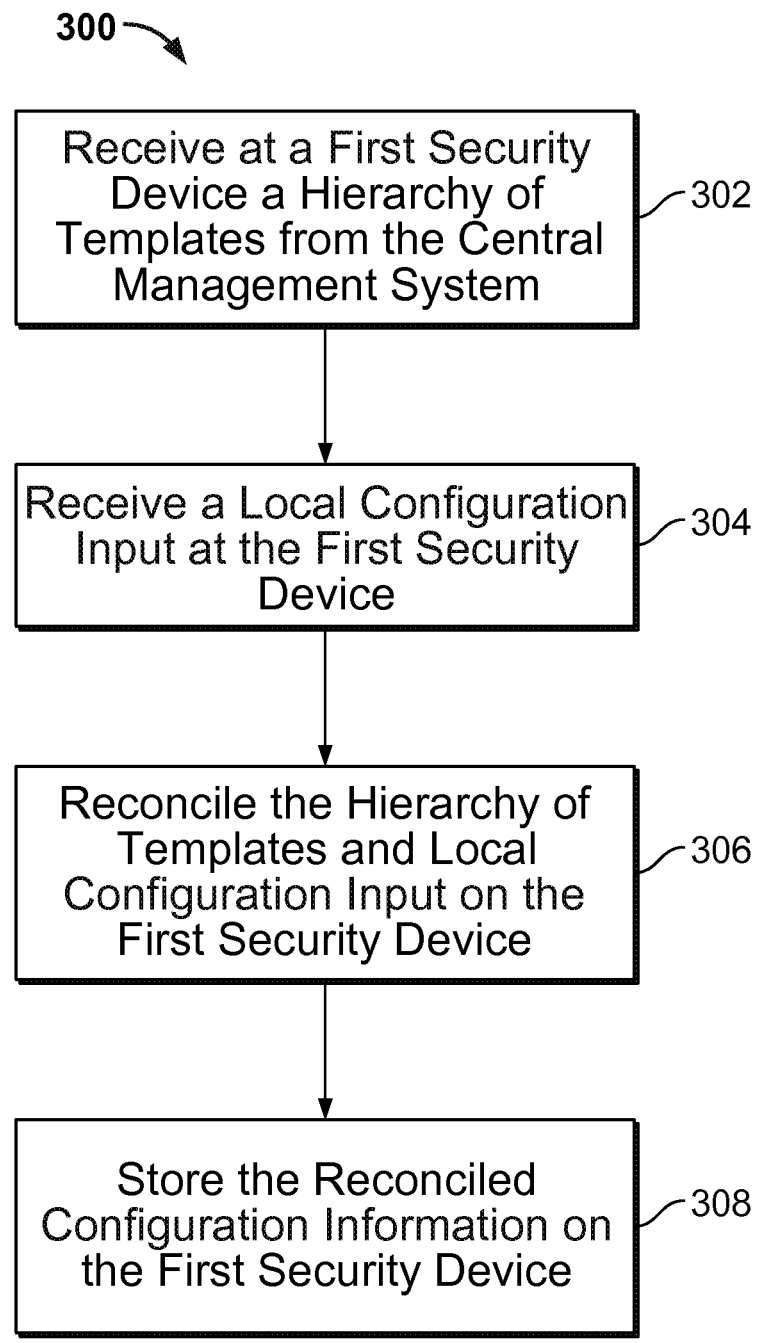
FIG. 3 is another flow diagram for deploying policy configuration across multiple security devices through hierarchical configuration templates in accordance with some embodiments.

FIG. 3 is another flow diagram for deploying policy configuration across multiple security devices through hierarchical configuration templates in accordance with some embodiments.

In some embodiments, FIG. 3 illustrates an example technique 300 performed by a central management system (e.g., central management system 102, although various central management systems are possible) for configuring security devices (e.g., firewall 106) by deploying policy configuration across multiple security devices through hierarchical configuration templates for configuring a plurality of security devices. The central management system stores configuration templates in a central configuration data store for the central management system. Configuration templates include configuration objects that can be used by a network device to process packets for enforcing a policy (e.g., a security policy).

As shown, at 302, a first security device receives a hierarchy of templates from a central management server. In some embodiments, the hierarchy of templates includes configuration information for a group of security devices. In some embodiments, the first security device is included in the group of security devices. At 304, a local configuration input is received at the first security device. At 306, reconciliation of the hierarchy of templates and the local configuration input is performed on the first security device. In some embodiments, the reconciliation process includes performing an object level reconciliation on the first security device to maintain device configuration consistency. In some embodiments, the reconciliation process further includes performing field level reconciliation on the first security device. At 308, the reconciled configuration information is stored locally on the first security device. In some embodiments, configuration setting change information that associates a template override with a higher priority template or a local configuration change with an authorized user input of a device specific configuration change is also stored on the first security device. In some embodiments, the configuration setting change information that associates a template override with a higher priority template or a local configuration change with an authorized user input of a device specific configuration change is also presented for display (e.g., in a GUI presentation).

Figure 4:
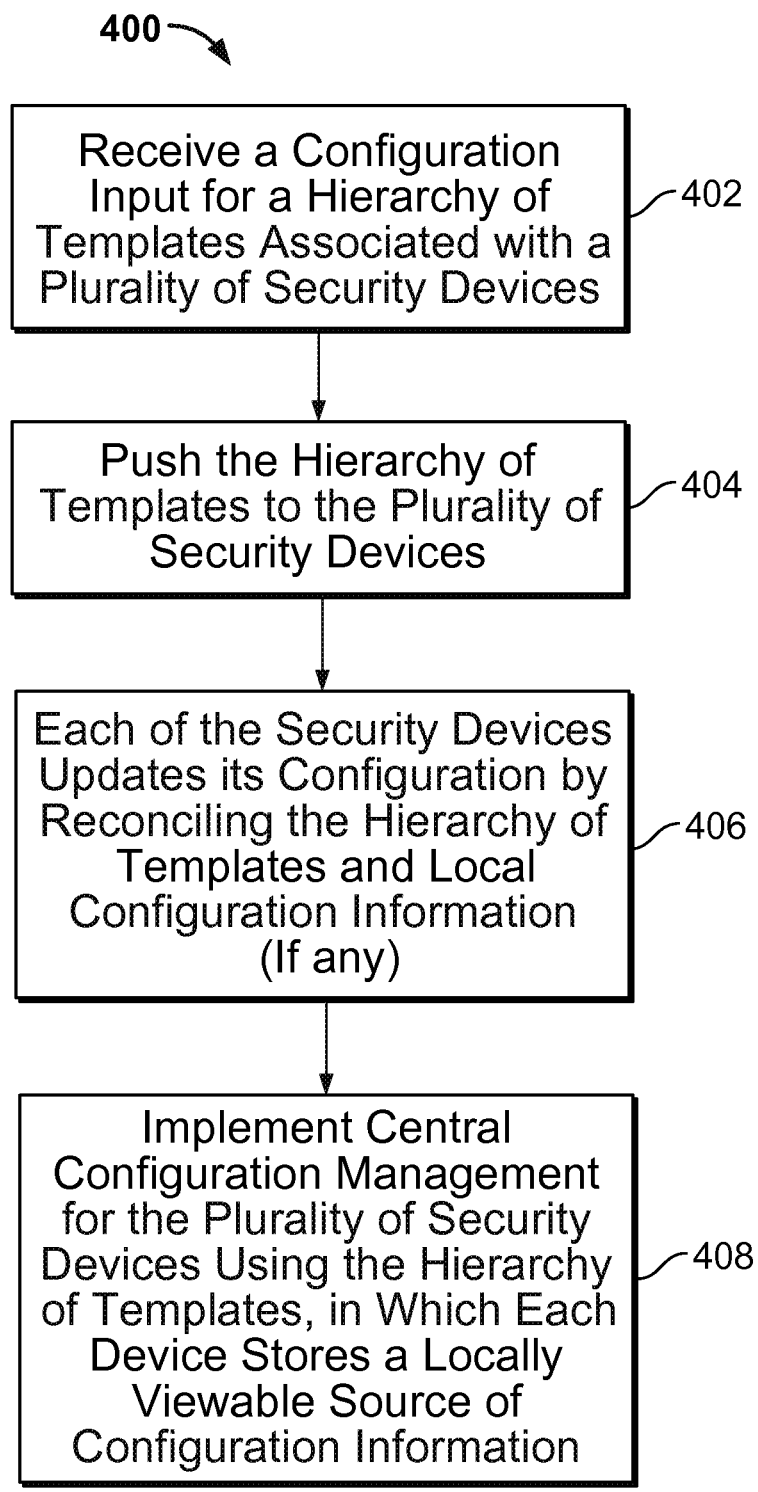
FIG. 4 is another flow diagram for deploying policy configuration across multiple security devices through hierarchical configuration templates in accordance with some embodiments.

FIG. 4 is another flow diagram for deploying policy configuration across multiple security devices through hierarchical configuration templates in accordance with some embodiments.

In some embodiments, FIG. 4 illustrates an example technique 400 performed by a central management system (e.g., central management system 102, although various central management systems are possible) for configuring security devices (e.g., firewall 106) by deploying policy configuration across multiple security devices through hierarchical configuration templates for configuring a plurality of security devices. The central management system stores configuration templates in a central configuration data store for the central management system. Configuration templates include configuration objects that can be used by a network device to process packets for enforcing a policy (e.g., a security policy).

As shown, at 402, a configuration input for a hierarchy of templates associated with a plurality of security devices is received. At 404, the hierarchy of templates are pushed to each of the plurality of security devices. At 406, each of the security devices updates its configuration by reconciling the hierarchy of templates and local configuration information (if any). At 408, implementing central management for the plurality of security devices using the hierarchy of templates that facilitates device specific configuration based on local configuration information and template override of template-based configuration information, in which each security device stores a locally viewable source of configuration setting information is performed. In some embodiments, the locally viewable source of configuration setting information includes a configuration setting change history. In some embodiments, the locally viewable source of configuration setting information includes a configuration setting change history that facilitates a revertable security device configuration performed locally. For example, a configuration rollback can be performed on one or more of the plurality of security devices to revert to a local configuration change or to revert to a different level of template hierarchy configuration for an object or field. In some embodiments, a preview of a configuration change on each of the plurality of security devices is available for display to a security admin prior to pushing the hierarchy of templates to each of the plurality of security devices.

In some embodiments, deploying policy configuration across multiple security devices through hierarchical configuration templates for configuring a plurality of security devices further includes performing an object level and field level reconciliation, in which an object includes one or more related fields (e.g., system object includes host name, IP address, and mask). In some embodiments, deploying policy configuration across multiple security devices through hierarchical configuration templates for configuring a plurality of security devices further includes performing a field level merge based on a priority relationship of the hierarchy of templates and local configuration information for the first security device.

In some embodiments, deploying policy configuration across multiple security devices through hierarchical configuration templates for configuring a plurality of security devices further includes converting configuration information provided by the hierarchy of templates configuration locally on the first security device based on attributes associated with the first security device, in which converting supports upgrade or downgrade of configuration information based on translation information received from a central management server.

Figure 5A:
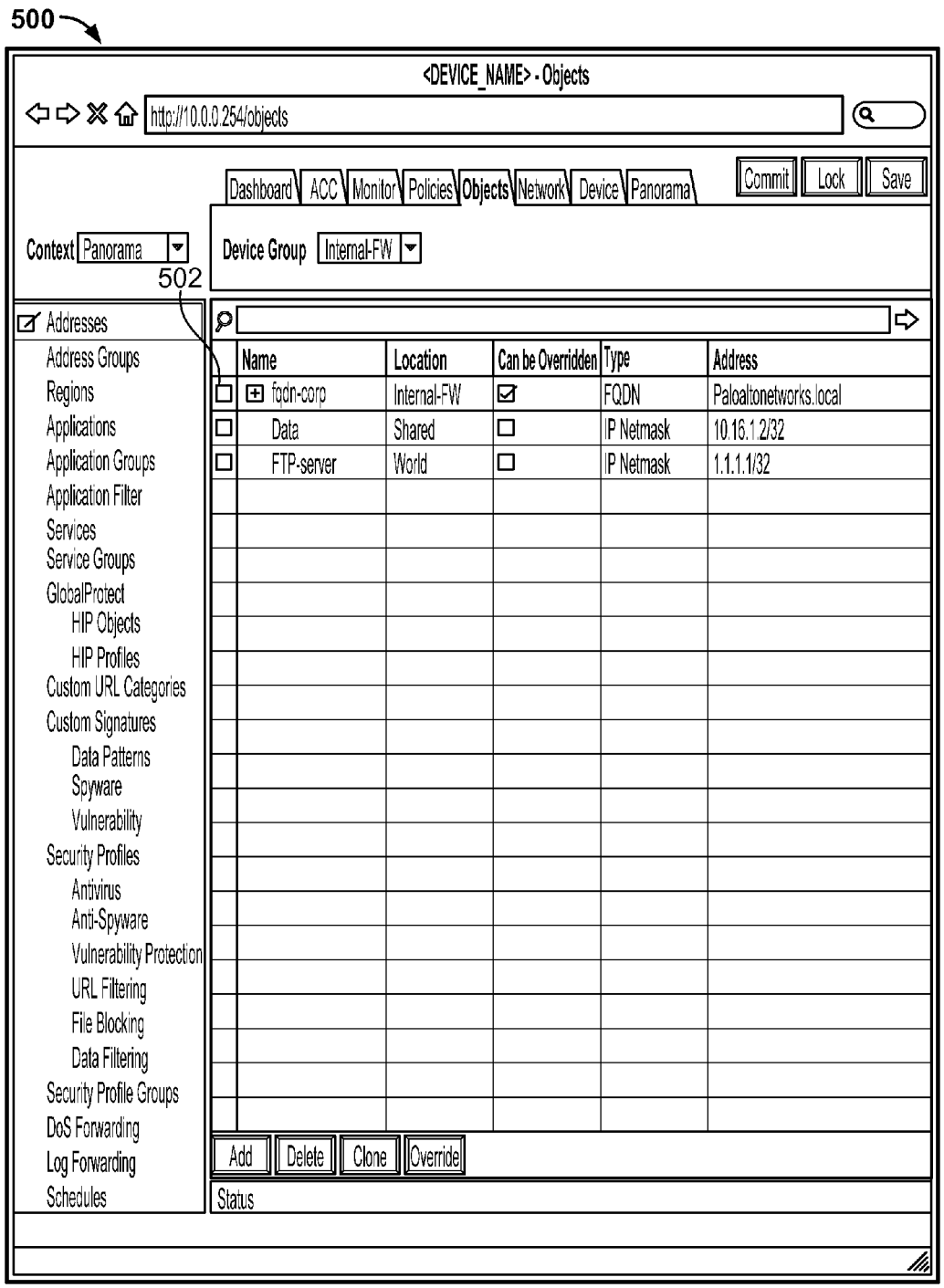
FIG. 5A shows a screen shot of an example configuration on a configuration management server (CMS) in accordance with some embodiments.

FIG. 5A shows a screen shot of an example configuration on a configuration management server (CMS) in accordance with some embodiments. In particular, FIG. 5A shows a screen shot 500 that provides an effective configuration on a CMS for an object class 'address'. The address object instance 'fqdn-corp', as shown at 502, shows an effective value 'paloaltonetworks.local' and indicates this value is defined in template 'Internal-FW.'

Figure 5B:
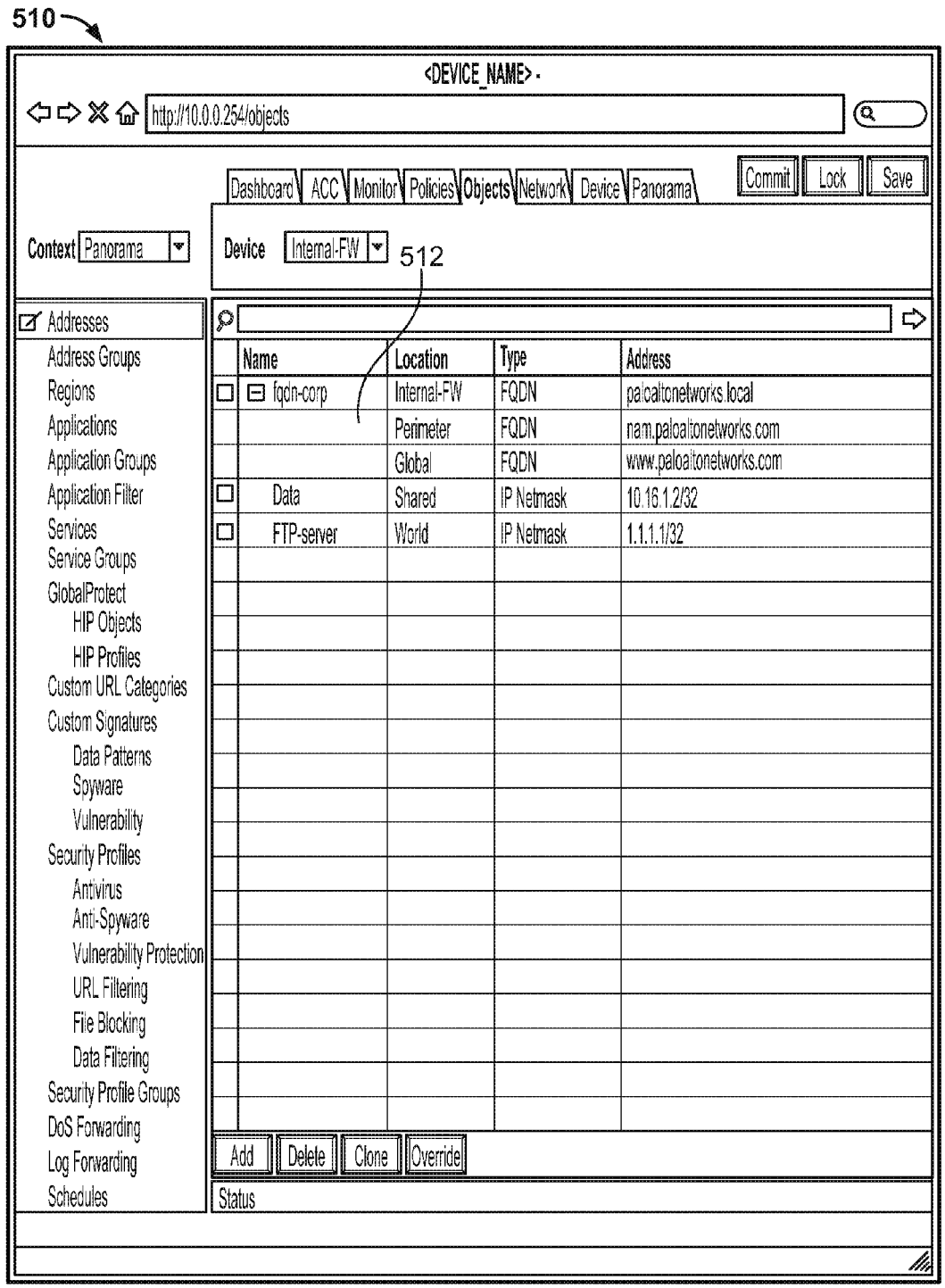
FIG. 5B shows a screen shot of an example reconciliation result of a merged template for configuring a security device in accordance with some embodiments.

FIG. 5B shows a screen shot of an example reconciliation result of a merged template for configuring a security device in accordance with some embodiments. In particular, FIG. 5B shows a screen shot 510 in which an expansion '+' sign near the name 'fqdn-corp', as shown at 512, indicates the final value is an overridden value. In some embodiments, an overridden flag is checked for enabling any lower priority template to override the value. Screen shot 510 shows a result of clicking on '+' sign to expand the configuration template information associated with 'fqdn-corp'. In this example, the object 'fqdn-corp' was originally defined in template 'Global', which is overridden by 'Perimeter', and this is also subsequently overridden by template 'Internal-FW' as shown in screen shot 510. The screen shot 510 also shows two other address objects, 'Data' and 'FTP-server', that are not overridden by any other templates. The location field indicates the templates where the object is defined (e.g., configuration information associated with the object, which can be associated with a hierarchy of templates).

In some embodiments, when a hierarchy of templates includes overlapping or conflicting configuration information, such as at a configuration object or field level within a particular configuration object, then the conflict can be resolved using various reconciliation techniques as described herein to generate a merged resultant configuration template. In some embodiments, local configuration information can also be provided and reconciled using various techniques as described herein.

Figure 6:
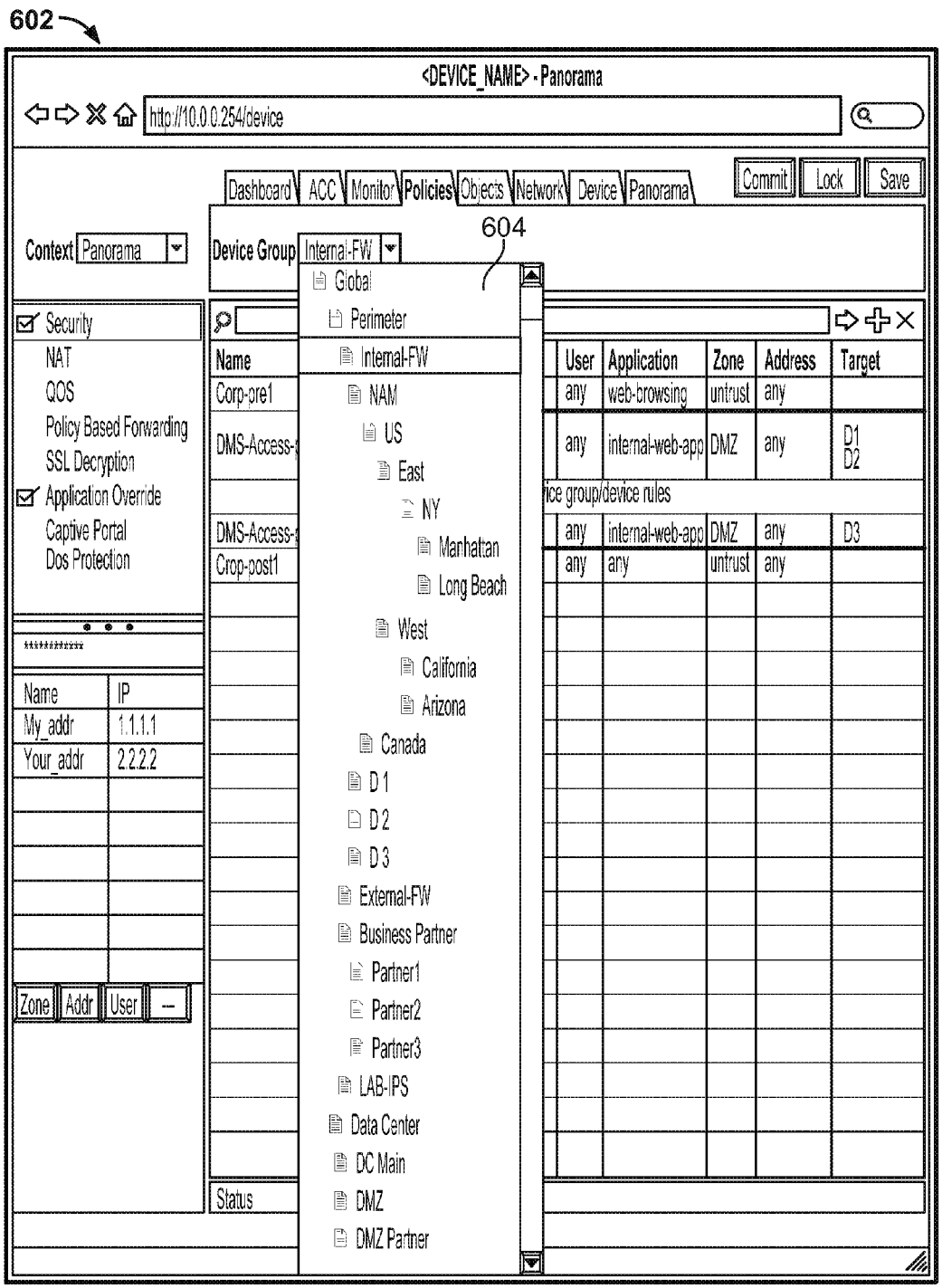
FIG. 6 is a diagram of a screen shot of a central configuration management interface illustrating device groups in accordance with some embodiments.

FIG. 6 is a diagram of a screen shot of a central configuration management interface illustrating device groups in accordance with some embodiments. As shown, a screen shot 602 of a central configuration management interface includes a window 604 for displaying device groups. The device groups can be used to associate various security devices for centralized configuration using layered or hierarchical templates as described herein with respect to various embodiments.

Figure 7:
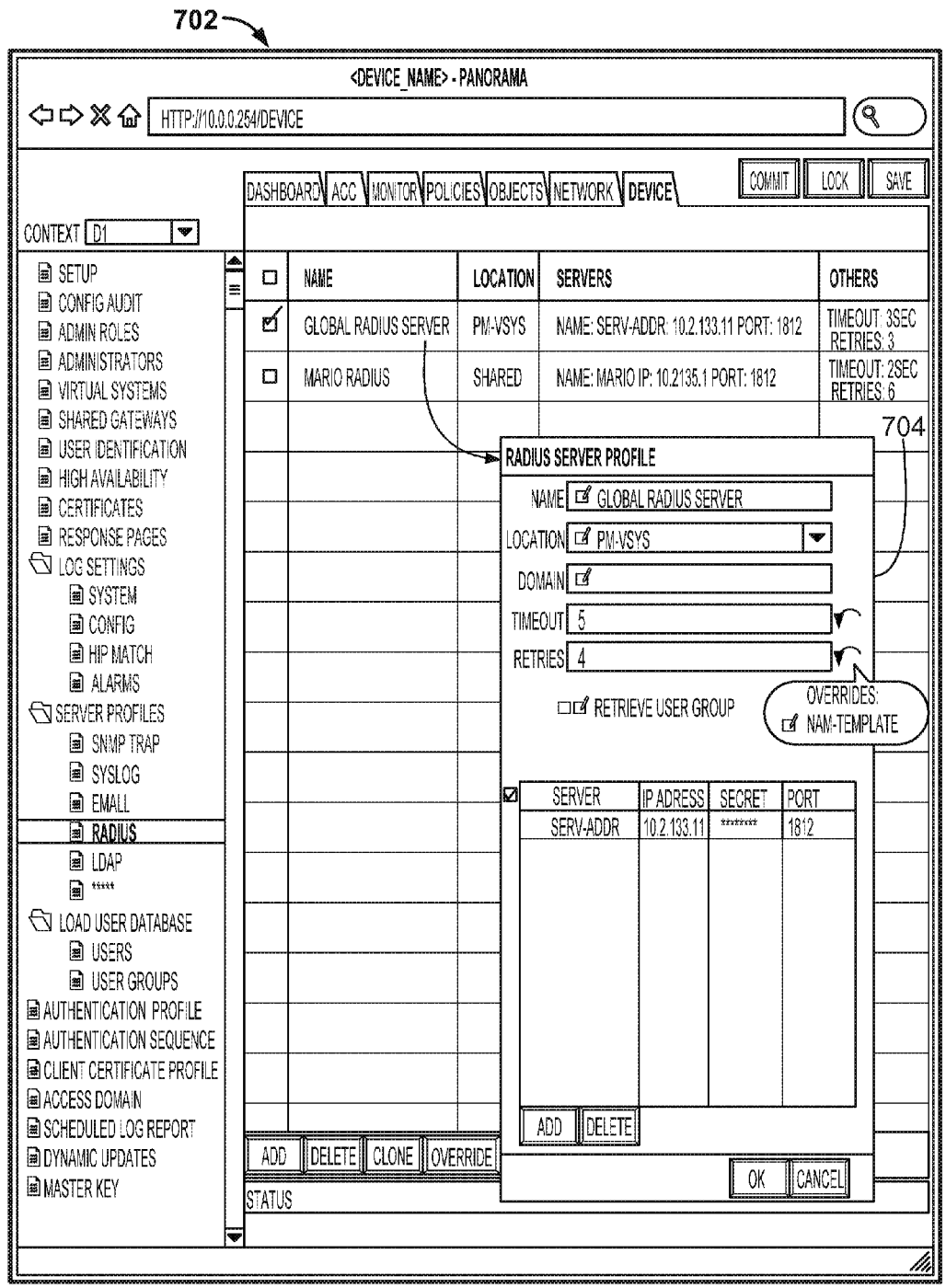
FIG. 7 is a diagram of a screen shot of a central configuration management interface illustrating configuration template overrides in accordance with some embodiments.

FIG. 7 is a diagram of a screen shot of a central configuration management interface illustrating configuration template overrides in accordance with some embodiments. As shown, a screen shot 702 of a central configuration management interface includes a window 704 for displaying a security device profile, in this case a RADIUS server profile, that indicates configuration template overrides, in this case, overrides of the NAM-template. The template override allows for centralized configuration using layered or hierarchical templates as described herein with respect to various embodiments.

Figure 8:
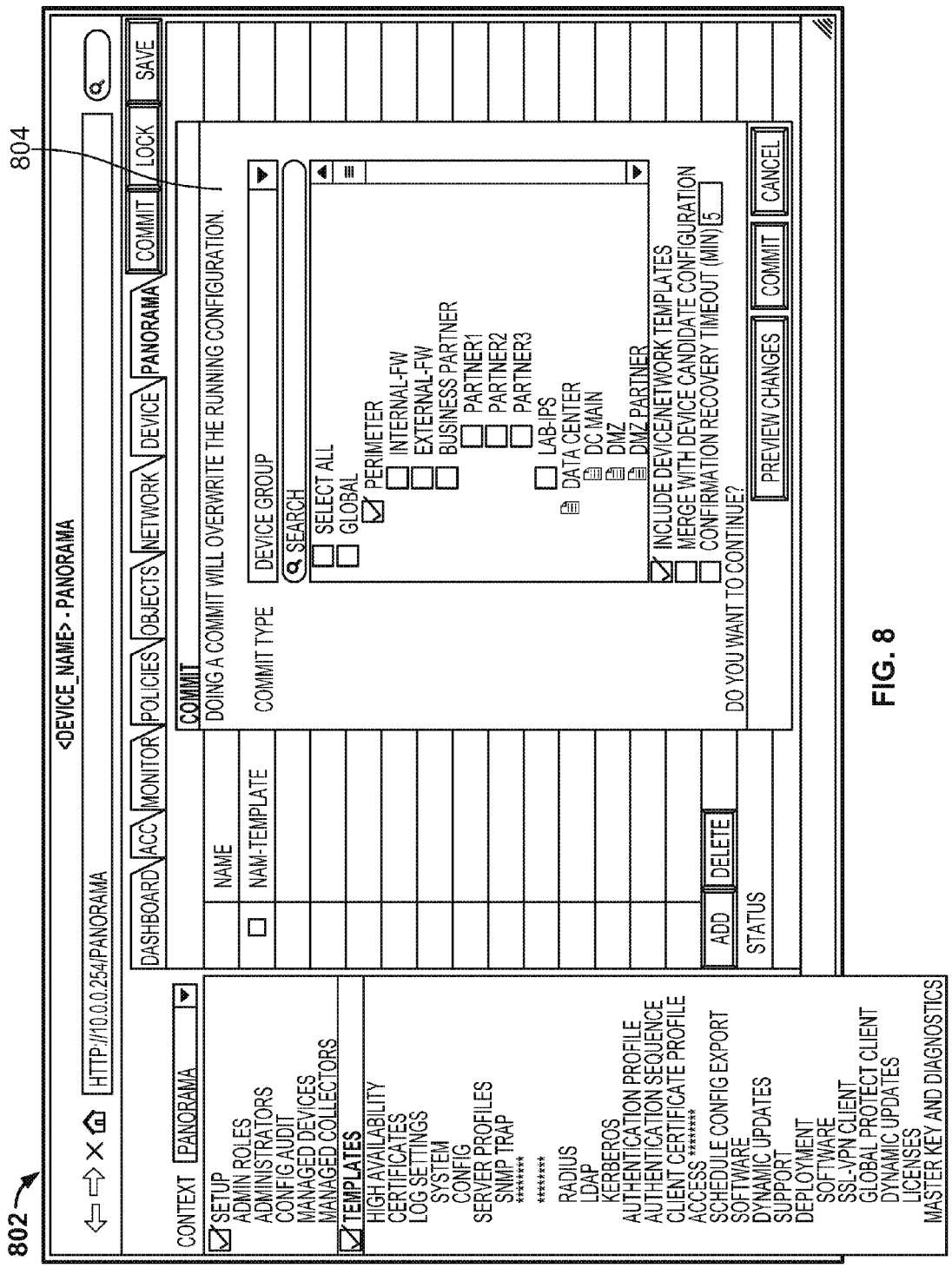
FIG. 8 is a diagram of a screen shot of a central configuration management interface illustrating a configuration commit window in accordance with some embodiments.

FIG. 8 is a diagram of a screen shot of a central configuration management interface illustrating a configuration commit window in accordance with some embodiments. As shown, a screen shot 802 of a central configuration management interface includes a window 804 for displaying a configuration commit for a device group. As also shown, whether to include device/network templates is selected as an option, and the merge with device candidate configuration option and confirmation recovery timeout option are not selected in this example.

Figure 9:
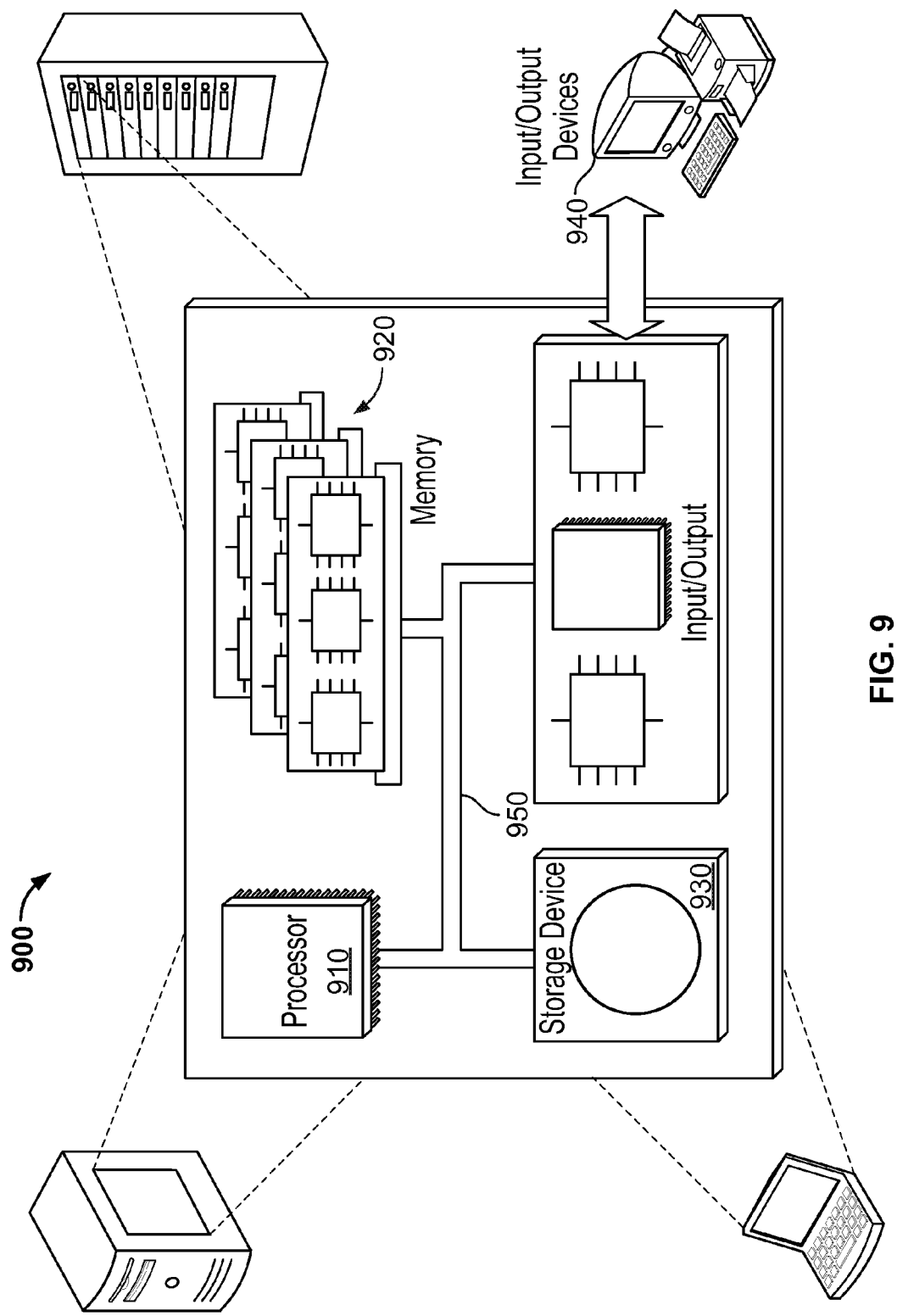
FIG. 9 is a schematic diagram of a generic computer system in accordance with some embodiments.

FIG. 9 is a schematic diagram of a generic computer system in accordance with some embodiments. The system 900 can be used for practicing operations described in association with the techniques 200, 300, and 400 in FIGS. 2, 3, and 4. For example, a central management system can be implemented using one or more computer systems. In another example, a security device can be implemented using one or more computer systems. In some implementations, security devices include custom hardware, for instance, additional input/output devices for connecting to networks.

The system 900 can include a processor 910, a memory 920, a storage device 930, and input/output devices 940. Each of the components 910, 920, 930, and 940 are interconnected using a system bus 950. The processor 910 is capable of processing instructions for execution within the system 900. Such executed instructions can implement one or more components of a central management system, for example. In some implementations, the processor 910 is a single-threaded processor. In other implementations, the processor 910 is a multi-threaded processor. The processor 910 is capable of processing instructions stored in the memory 920 or on the storage device 930 to display graphical information for a user interface on the input/output device 940.

The memory 920 is a computer readable medium such as volatile or non-volatile that stores information within the system 900. The memory 920 can store data structures representing configuration object databases, for example. The storage device 930 is capable of providing persistent storage for the system 900. The storage device 930 can be a floppy disk device, a hard disk device, an optical disk device, or a tape device, or other suitable persistent storage means. The input/output device 940 provides input/output operations for the system 900. In some implementations, the input/output device 940 includes a keyboard and/or pointing device. In various implementations, the input/output device 940 includes a display unit for displaying graphical user interfaces.

The input/output device 940 can provide input/output operations for a network device. For example, the input/output device 940 can include Ethernet ports or other networking ports to communicate with computer networks.

Various implementations of the systems and techniques described here can be realized in digital electronic circuitry, integrated circuitry, specially designed ASICs (application specific integrated circuits), computer hardware, firmware, executing software, non-executing software, or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In some implementations, users can interact with a network device using a computer on a network. For example, a user on a personal computer can interact with a network device connected on the network using a web browser, a Secure Shell (SSH) client, a telnet client, or the like. In various implementations, a user can interact with a network device using a computer connected to the security device on a serial port, for example, a Recommended Standard 232 (RS-232) port.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for configuring a plurality of security devices, comprising:
   a processor configured to:
      receive a configuration input for a hierarchy of templates; and
      implement central configuration management for the plurality of security devices using the hierarchy of templates that facilitates device specific configuration based on local configuration information and template override of template based configuration information, wherein the implementing of the central configuration management for the plurality of security devices comprises:
      for each security device:
         in the event that local configuration information conflicts with configuration information of a template, determine whether a priority of the template is higher than a priority of an object associated with the each security device; and
         in the event that the priority of the template is higher than the priority of the object associated with the each security device, override the local configuration information with the configuration information of the template; and
   a memory coupled to the processor and configured to provide the processor with instructions.

2. The system recited in claim 1, wherein a hierarchical relationship of a plurality of templates determines an override priority for objects and fields with each of the templates.

3. The system recited in claim 1, wherein the template comprises a predefined table of configuration settings for configuring a group of security devices, and wherein local configuration information comprises device specific configuration for configuring a specified security device.

4. The system recited in claim 1, wherein the implementing of the central configuration management for the plurality of security devices further comprises:
   for each security device:
      override the local configuration information with the configuration information of the template only if no local configuration change with an authorized user input of a device specific configuration change exists.

5. The system recited in claim 1, wherein the processor is further configured to:
   push the hierarchy of templates to a group of managed security devices from a central management server (CMS).

6. The system recited in claim 1, wherein the processor is further configured to:
   push the hierarchy of templates to a group of managed security devices from a central management server (CMS), wherein the plurality of security devices are grouped based on location, type of device, and/or processing level of device.

7. The system recited in claim 1, wherein the processor is further configured to:
   push the hierarchy of templates to a group of managed security devices from a central management server (CMS), wherein the plurality of security devices are grouped based on location, type of device, and/or processing level of device, and wherein the plurality of security devices include a plurality of firewalls.

8. The system recited in claim 1, wherein the local configuration information includes blocking all packets from a first address, allowing all packets to a second address, or a combination thereof.

9. The system recited in claim 1, wherein the local configuration information and the template based configuration information are specified by one or more configuration objects, and wherein the one or more configuration objects specify how the security device processes packets.

10. The system recited in claim 1, wherein the local configuration information and the template based configuration information are specified by one or more configuration objects, and wherein the one or more configuration objects specify how the security device controls or processes user authentication and authorization.

11. The system recited in claim 1, wherein the local configuration information and the template based configuration information are specified by one or more configuration objects, and wherein the one or more configuration objects is represented as an extensible markup language (XML) object.

12. The system recited in claim 1, wherein the local configuration information and the template based configuration information are specified by one or more configuration objects, and wherein a configuration object is overridden by a higher priority template at an object level to perform object level reconciliation, the object level reconciliation relating to maintaining device configuration consistency.

13. The system recited in claim 1, wherein the local configuration information and the template based configuration information are specified by one or more configuration objects, wherein a configuration object comprises one or more fields, and wherein a configuration object is overridden by a higher priority template at a field level to perform field level reconciliation, the field level reconciliation relating to a field level merge based on a priority relationship of the hierarchy of templates and the local configuration information.

14. A system for configuring a plurality of security devices, comprising:
a processor configured to:
receive at a first security device a hierarchy of templates from a central management server, wherein the hierarchy of templates includes configuration information for a group of security devices, and wherein the first security device is included in the group of security devices; and
reconcile on the first security device's configuration information included in the hierarchy of templates and device specific configuration based on local configuration information, wherein the reconciling on the first security device's configuration information comprises:
in the event that local configuration information conflicts with configuration information of a template, determine whether a priority of the template is higher than a priority of an object associated with the first security device; and
in the event that the priority of the template is higher than the priority of the object associated with the first security device, override the local configuration information with the configuration information of the template; and
a memory coupled to the processor and configured to provide the processor with instructions.

15. The system recited in claim 14, wherein the processor is further configured to:
perform field level reconciliation on the first security device, the field level reconciliation relating to a field level merge based on a priority relationship of the hierarchy of templates and the local configuration information.

16. The system recited in claim 14, wherein the processor is further configured to:
store configuration setting change information based on the reconciliation of the first security device's configuration information included in the hierarchy of templates and device specific configuration based on local configuration information.

17. The system recited in claim 14, wherein the processor is further configured to:
store configuration setting change information that associates a template override with the higher priority template or a local configuration change with the authorized user input of the device specific configuration change.

18. The system recited in claim 14, wherein the processor is further configured to:
display configuration setting change information that associates a template override with the higher priority template or a local configuration change with the authorized user input of the device specific configuration change.

19. A method for configuring a plurality of security devices, comprising:
receiving at a first security device a hierarchy of templates from a central management server, wherein the hierarchy of templates includes configuration information for a group of security devices, and wherein the first security device is included in the group of security devices; and
reconciling on the first security device's configuration information included in the hierarchy of templates and device specific configuration based on local configuration information, wherein the first security device performs an object level reconciliation to maintain device configuration consistency, and wherein the reconciling on the first security device's configuration information comprises:
in the event that local configuration information conflicts with configuration information of a template, determining whether a priority of the template is higher than a priority of an object associated with the first security device; and
in the event that the priority of the template is higher than the priority of the object associated with the first security device, overriding the local configuration information with the configuration information of the template.

20. The method of claim 19, further comprising:
performing a field level merge based on a priority relationship of the hierarchy of templates and local configuration information for the first security device.

* * * * *